United States Patent

Shukovsky et al.

[11] Patent Number: 5,830,587
[45] Date of Patent: Nov. 3, 1998

[54] MAGNETIC DEVICES WITH ENHANCED POLES

[75] Inventors: Harold B. Shukovsky, Framingham; Michelle Martin, Westford; Michael Mallary, Berlin; Alan Lee Sidman, Wellesley, all of Mass.

[73] Assignee: MKE-Quantum Components Colorado, LLC, Louisville, Colo.

[21] Appl. No.: 743,270

[22] Filed: Nov. 4, 1996

Related U.S. Application Data

[62] Division of Ser. No. 831,615, Feb. 6, 1992, Pat. No. 5,571,573.

[51] Int. Cl.⁶ .............................. G11B 5/66; C23C 14/14
[52] U.S. Cl. ................... 428/692; 428/694 R; 428/900; 428/547; 428/599; 428/250; 428/294; 427/128; 427/130; 427/509; 427/531; 336/234; 307/106; 307/415; 204/192.2; 148/304; 148/311; 148/312; 148/403

[58] Field of Search ................ 428/692, 694 R, 428/900; 307/106, 415; 336/234; 148/304, 403, 312, 311; 204/192.2; 427/128, 531, 547, 599, 130, 250, 294, 374.1, 509, 383.1, 430.1

[56] References Cited

U.S. PATENT DOCUMENTS 5,571,573  11/1996  Shukovsky ............................ 427/531

*Primary Examiner*—Leszek Kiliman
*Attorney, Agent, or Firm*—Debra A. Chun

[57] ABSTRACT

A process resulting in enhanced pole performance, relative to permalloy poles, in narrow track magnetic devices. A preferred process includes increasing the anisotropy field of the pole material while maintaining an acceptable coercivity level and near zero magnetostriction. One embodiment utilizes a NiCoFe alloy containing 22% cobalt by weight, heat treated in an easy axis magnetic field in a non-oxidizing atmosphere. This process achieves favorable domain structures at narrow pole tip widths.

24 Claims, 2 Drawing Sheets

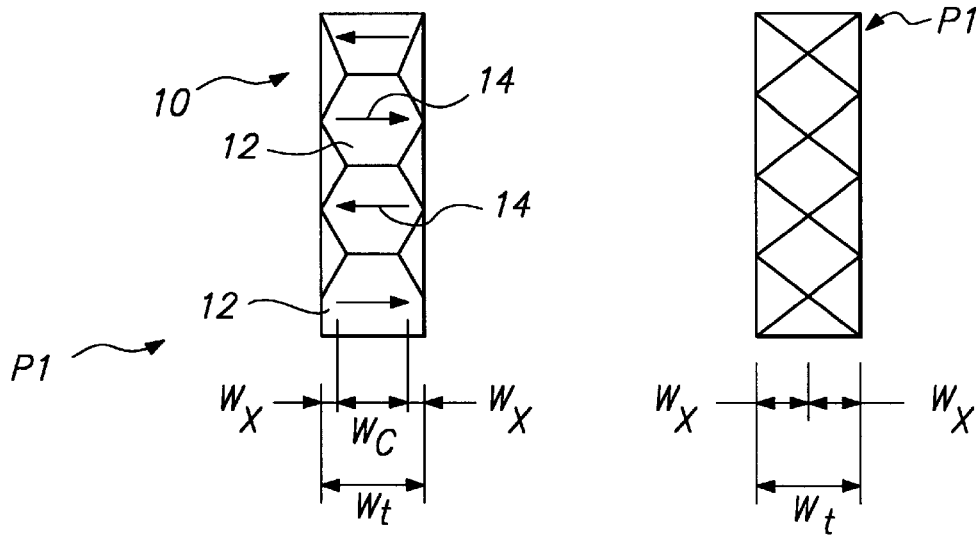
FIG. 1A
PRIOR ART
FIG. 1B
PRIOR ART
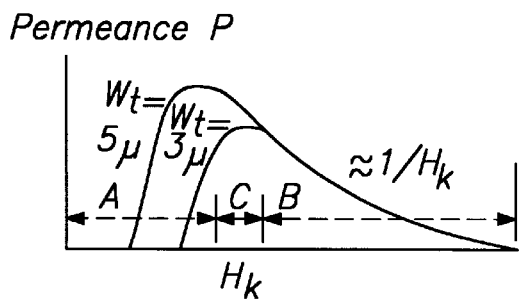
FIG. 2
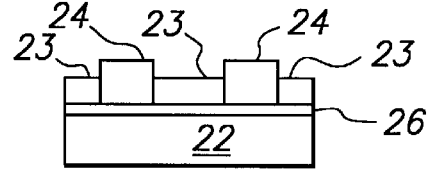
FIG. 3A
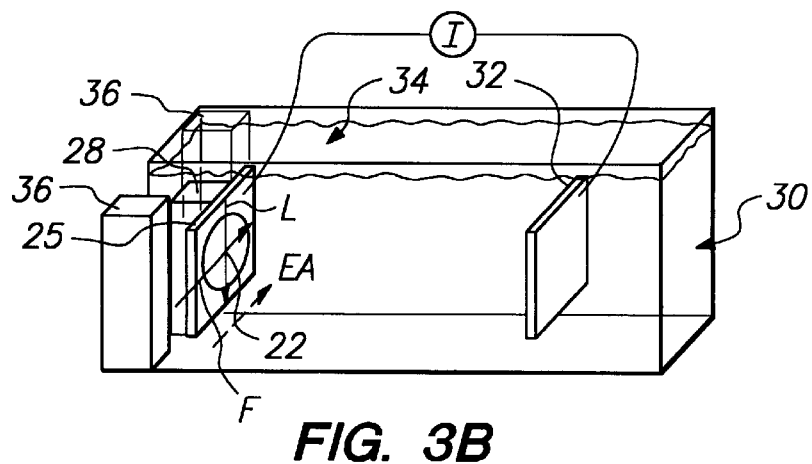
FIG. 3B

MAGNETIC DEVICES WITH ENHANCED POLES

This is a division of Ser. No. 831,615, Feb. 6, 1992, now U.S. Pat. No. 5,571,573.

BACKGROUND OF THE INVENTION

The present invention relates to read/write devices for high density magnetic recording.

Conduction of flux, such as in a magnetic head, is achieved by two mechanisms: domain wall motion and domain rotation. Domain wall motion results in flux being transmitted through a head along the walls of a domain, or domains, the flux spreading out along the domain walls as the flux seeks to return to equilibrium. However, while domain wall motion facilitates conduction of flux at low frequencies, it is a poor vehicle for conduction of flux at high frequencies. Furthermore, defects in the material in a head can be the source of Barkhausen noise as wall motion is perturbed by these defects. Such noise can result in erroneous readings of recorded data.

FIG. 1a schematically shows a pole tip region 10 of a magnetic transducer, such as a prior art thin film head, configured to achieve conduction by domain rotation when reading flux from a magnetic medium. Pole P1 is provided with central magnetic domains 12, having an axis of anisotropy (easy axis) indicated by the at rest domain state arrows 14 transverse to the longitudinal axis of the pole. Pole P1 has a total width $W_t$, which includes the width $W_c$ of the center region and the combined width $2W_x$ of the edge domains, such that $W_t = W_c + 2W_x$. It is in the center region where the desired conduction by domain rotation occurs. The probability of Barkhausen noise is inversely related to center region width $W_c$.

FIG. 1b shows a prior art pole piece P1 having a narrow width with a criss-cross domain structure. In such arrangement, the edge domains each still have a width $W_x$ but there is no appreciable width of a center conduction section. Hence, in this case, $W_t = 2W_x$.

Magnetic switching in the pole tips by the rotation mechanism is preferable to switching by domain wall motion. The advantages of switching by rotation include higher frequency response, higher efficiency and low probability of Barkhausen noise.

At rest domain configuration, in part, is controlled by inducing uniaxial anisotropy during deposition. In prior art thin film heads, both positive and negative magnetostriction (in conjunction with anisotropic stress) have been used to reinforce favorable domain configurations induced by a magnetic field during plating of the head pole pieces.

The anisotropy field ($H_k$) of a typical thin film head may be expressed in terms of effective and intrinsic anisotropy, as follows:

$$Hk(\text{effective}) = Hk(\text{intrinsic}) + \frac{3}{M_s} d\lambda,$$

where, d=anisotropic stress, X=magnetostriction constant, where $M_s$=saturation magnetization. Hence, the effective anisotropy field $H_k$ can be increased by controlled application of magnetostriction and anisotropic stress as a result of the deposition process and pole geometry.

SUMMARY OF THE INVENTION

One aspect of the present invention relates to a process for forming at least one pole of a magnetic device, including the steps of: determining a maximum permeance for a chosen pole width, relating that permeance to expected anisotropy field for a pole having the chosen pole width, relating that anisotropy field to a desired cobalt concentration in a deposition stream, and forming the at least one pole from the stream, the pole having approximately the desired cobalt concentration. Preferably the process includes forming the pole having near zero magnetostriction in the range of about $-5.3 \times 10^{-7}$ to zero and annealing the formed pole.

The invention may include any of the following features: the coercivity of the formed pole is at or below 1 Oersted; the formed pole, at the pole tip, is 3 microns wide, greater than one micron thick and has a permeability of less than 1500; the formed pole anisotropy field is in the range of 3 to 14 Oersteds; the formed pole anisotropy is 9 Oersteds before annealing and 12 Oersteds after annealing; the formed pole has a ratio of $W_c/W_t$ in the range of about 0.5 to 0.7, with coercivity at or about below 1 Oersted; the formed pole has a saturation flux density of about 13,000 Gauss; the formed pole is about 61.5–66% nickel by weight, 13–14.5% iron by weight, and 21–24% cobalt by weight, and preferably is about 64.5% nickel, 13.5% iron, and 22% cobalt by weight after annealing; the formed pole has a transverse easy axis and the annealing is performed by baking the pole in a vacuum at about 240 degree centigrade for about 8 hours in an orienting magnetic field parallel to the easy axis of the pole, the orienting field preferably at about 1,100 Oersteds or more.

A preferred deposition stream includes a nickel-iron plating bath with cobalt content in the range of about 20–25% by weight, and preferably having cobalt chloride hexahydrate at about 3.65 grams per liter. The bath preferably is a modified Watt's bath including nickelous chloride, sodium saccharin, ferrous chloride, and cobaltous chloride.

In another aspect of the invention, a process for producing a thin film head includes the steps of: defining a pole pattern on a metallized surface of a wafer, mounting the wafer on a cathode fixture and immersing it in a plating bath, forming a cobalt alloy pole according to the pole pattern while maintaining magnetostriction near zero and controlling cobalt content to achieve a desired pole permeance, and annealing the formed pole. Preferably at least one pole is annealed with the ratio of $W_c/W_t$ of the at least one pole in the range of 0.5 to 0.7.

Other advantages and features will become apparent from the following description of the preferred embodiment and from the claims.

BRIEF DESCRIPTION OF THE DRAWINGS

We first briefly describe the drawings.

FIG. 1a shows the domain configuration in the pole tip-region of a magnetic pole capable of conduction of flux by rotation.

FIG. 1b shows a crisscross domain structure of a magnetic pole.

FIG. 2 is a plot of permeance as a function of anisotropy field in a plated film.

FIGS. 3a, 3b show a preferred deposition method and apparatus.

DETAILED DESCRIPTION OF THE PREFERRED EMBODIMENT

High density recording requires a head design with narrow track width, and preferably with the domain configuration shown in FIG. 1a. This is achieved by reducing the width $W_t$ of the pole(s). However, as the head pole width $W_t$ is narrowed down to around three microns, the central flux conduction region width $W_c$ tends to approach zero, with the domain structure thus assuming the known configuration shown in FIG. 1b. At this point, domain rotation fails as a functional mechanism of flux conduction and the head becomes less efficient. Therefore, the ratio of $W_c/W_t$ appears to have significance in narrow track head design. Our preferred ratio of $W_c/W_t$ is in the range of 0.5 to 0.7, with an acceptable level of coercivity ($H_c$) at about one Oersted or less, at least for maintaining domain rotation in a narrow track head about three microns wide.

We believe that approximately one Oersted is near the high end of an acceptable coercivity level for a narrow track (e.g., three microns) read/write head, but the actual desirable value will depend upon specific widths and applications. For purposes of the present invention, the acceptable level of coercivity for a given geometry may be defined as that level which permits a transverse at rest domain state orientation to resume prior to reading when cycling between reading and writing.

We have found that increasing the magnetic anisotropy field relative to an acceptable level of coercivity (i.e., $H_k$ relative to $H_c$) in an alloy magnetic head improves the $W_c/W_t$ ratio, thus to better assure achieving the domain configuration of FIG. 1a. Hence, if the ratio of $H_k/H_c$ is kept relatively high (with $H_k$ and $H_c$ at acceptable levels discussed below) then the domain structure of FIG. 1a can be obtained.

Figure 2A:
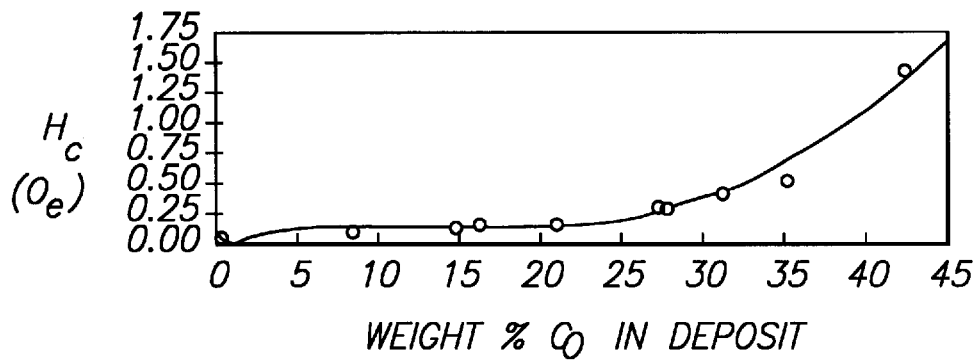
FIG. 2a is a plot of plated film coercivity as a function of weight percent cobalt in a plated film.
Figure 2B:
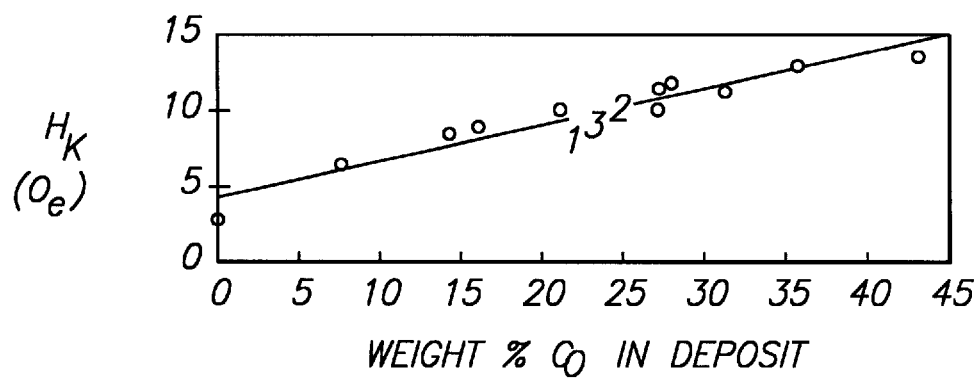
FIG. 2b is a plot of plated film anisotropy field $H_k$ as a function of weight percent cobalt in a plated film.

We have recognized that the $H_k/H_c$ ratio can be favorably controlled. More specifically, we have found that as cobalt is added to a nickel-iron alloy, both the $H_c$ and $H_k$ increase, although at different rates. This can be discerned from a comparison of graphs 2a and 2b. In graph 2a, $H_c$, in Oersteds, is plotted as a function of weight percent of cobalt in the deposited film. In FIG. 2b, plated film $H_k$, in Oersteds, is plotted as a function of weight percent cobalt in the film. It will thus be seen that the rate of increase in $H_c$ becomes more rapid where cobalt content is above approximately 25% by weight, while $H_k$ increases rather monotonically as percent cobalt content increases. Hence, by prudent selection of cobalt content, acceptable levels of $H_k$ and $H_c$ will be obtained at around or below 25% cobalt by weight, in a nickel-iron alloy pole. Thus, by adjusting cobalt, the $H_k/H_c$ ratio can be optimized for a given pole.

Figure 2C:
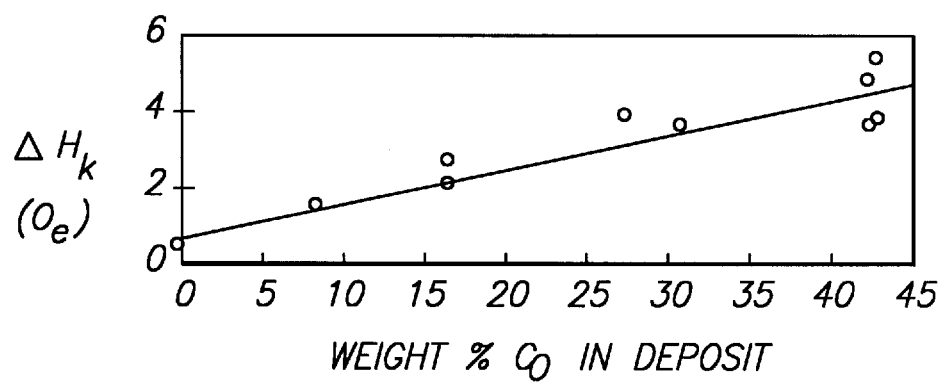
FIG. 2c is a plot of the change in anisotropy field $H_k$ due to anneal as a function of weight percent cobalt in a plated film.

In addition, we have also discovered that annealing further improves the $H_k/H_c$ ratio in plated films. In fact, while there is little or no change in $H_c$ upon annealing, there is significant increase in $H_k$. The change in $H_k$ due to the anneal appears to be a linear function of the cobalt content. Our test results confirm such belief, at least within the range of zero to about forty-three percent cobalt by weight, as indicated in FIG. 2c.

Furthermore, we believe that too little cobalt can yield a pole with too low $H_k$, with low permeance, with high Barkhausen noise and lack of consistent process results. Too much cobalt can raise coercivity too high and can substantially reduce permeability, thus yielding a pole with low permeance.

Permeance P is defined as the product of permeability $\mu$, pole width $W_t$ (affected by mask dimensions) and pole thickness T (affected by deposition parameters). Permeance is functionally related to $H_k$ for a given pole width $W_t$, as shown in FIG. 2. A maximum value of P for a given pole width can be obtained by testing samples having various levels of permeability and thickness (having that pole width). Permeance can be measured in a conventional manner.

Thus we can now relate domain configuration, cobalt content, $H_k$, $H_c$, their ratio, P, and the $W_c/W_t$ ratio. In the example of a three micron nickel-iron alloy, if cobalt content is low, $H_k$ will be low (see FIG. 2b); since $H_k$ is low, P will be relatively low (see region A of FIG. 2, curve $W_t=3\mu$) and the $H_k/H_c$ ratio will be relatively low (compare FIGS. 2a, 2b). If cobalt is high, $H_k$ will be high (see FIG. 2b); since $H_k$ is high, P will be relatively low (see region B of FIG. 2, curve $W_t=3\mu$); and since $H_c$ also will be high (see FIG. 2a), the $H_k/H_c$ ratio again will be relatively low.

Permeance will be highest in such pole (see region C of FIG. 2, curve $W_t=3\mu$) when an appropriate value of $H_k$ is selected for a given pole permeability, thickness and width. The $H_k/H_c$ ratio can be optimized when an appropriate cobalt content is selected according to FIGS. 2a, 2b. The highest $H_k/H_c$ ratio will be obtained after adjusting cobalt content by annealing. Thus, the $W_c/W_t$ ratio, which reflects the $H_k/H_c$ ratio, also will be favorably improved resulting in a non-zero $W_c/W_t$ ratio (preferably in the range of 0.5 to 0.7), with $H_c$ at an acceptably low level, so as to avail the desired domain configuration of FIG. 1a.

In practice of the present invention, a preferred method for forming at least one pole of a magnetic transducer for a chosen pole width includes determining maximum desired P, relating that P to a target $H_k$ as in FIG. 2, relating that target $H_k$ (as an annealed value) to a known cobalt bath concentration which yields test samples having the target $H_k$ (after anneal), and then forming a pole in a bath having that concentration, the pole then being annealed to achieve the target $H_k$ of FIG. 2.

A preferred method and apparatus will now be described in relation to FIGS. 3a, 3b, and includes electrodeposition of a cobalt-containing nickel-iron alloy 23 from bath 34 through the openings of a microlithographically defined resist mask pole pattern 24 onto a conductive metallized surface 26 on a wafer substrate 22. The wafer 22 is mounted on a cathode fixture 28, and is immersed in plating bath 34 in plating cell 30. An anode 32 is provided in the bath to complete the plating circuit.

Current is supplied to the cell by means of an external power supply (I) to induce deposition of the metal film from the plating bath 34. The plating bath includes metal salts of nickel, iron and cobalt, as well as buffering agent, stress controlling agent and surfactant, and may be otherwise operated in a conventional manner.

Magnetic source 36 is arranged about plating cell 30 so that the surface of wafer 22 is within a uniform uniaxial orienting magnetic field (arrow F) during electrodeposition. The field is applied parallel to the easy axis (arrow EA) of the pole, and perpendicular to pole length (arrow L).

The present invention may be practiced with a modified Watt's bath. A preferred bath which yielded favorable results is shown below:

109 g/l nickelous chloride (hydrated),
25 g/l boric acid,
0.8 g/l sodium saccharin,
0.2 g/l sodium lauryl sulphate,
1–2 g/l ferrous chloride (hydrated), 0–9.75 g/l cobaltous chloride (hydrated and preferably 3.65 g/l), pH~2.5, T~25 C., and Current density in the range of 5–10 milliamp/cm².

Alternative methods for producing desired films might include, but are not restricted to: sputter deposition, vacuum evaporation, ion plating, splat cooling, and electroless deposition. Furthermore, other bath compositions and other alloys than described above are contemplated within the spirit and scope of the present invention.

In the post-deposition stage, the wafer is annealed preferably in a vacuum in a magnetic field greater than the calculated demagnetization field of the pole tip. The axis of the applied field is parallel to the easy axis of the plated film. This process results in the change in $H_k$ as shown in FIG. 2c.

In one embodiment, we sought to produce a film with a final $H_k$ of 12 Oersteds. We plated films in a bath with a concentration of cobalt chloride hexahydrate of 3.65 grams per liter, which resulted in films having an $H_k$ of 9 Oersteds. Several samples had an $H_k$ of 12 Oersteds after annealing at about 240 decrees centigrade for about eight hours in a magnetic field of approximately 1100 Oersted parallel to the pole easy axis. The cobalt content in our samples ranged from 21 to 24 weight percent. One film composition which yielded a post-anneal $H_k$ of 12 Oersteds was about 64.5 percent nickel, 13.5 percent iron and 22 percent cobalt by weight.

In practice of the present invention, the $H_k/H_c$ ratio, at least for cobalt between about zero and 25 percent weight, is preferably in the range of 25 to 118. At 22 percent cobalt by weight, we achieved a $H_k/H_c$ ratio of about 109.

In practice of the present invention, it is possible to raise saturation flux density ($B_s$) of the plated pole to provide an extra writing ability for high linear density applications. In particular, the $B_s$ of a plated nickel-iron film increases as cobalt content of the film increases, since high $B_s$ cobalt is substituted for lower $B_s$ nickel-iron. Hence, our higher cobalt films favorably exhibit a raised $B_s$, perhaps up to about 13,000 Gauss.

In addition to the foregoing, a preferred embodiment of the present invention further includes minimizing the effect of the $3/M_s d$ factor in the effective $H_k$, to ease process requirements, while we boost the intrinsic $H_k$ of the formed device for an acceptably low level of $H_c$ to achieve a desirable $W_c/W_t$ ratio in a high permeance pole with lowered probability of Barkhausen noise. Preferably, magnetostriction is maintained on the negative side of, and near, zero, preferably in the range of $-5.3 \times 10^{-7}$ to zero, at least for cobalt at or below 25 percent by weight. We measure magnetoelastic sensitivity of a sample plated film and then adjust nickelous chloride and ferrous chloride bath concentrations accordingly and in a conventional manner so that the next sample is at or closer to desired magnetostrictive composition.

While the above discussion has been addressed to magnetic poles, a distinction may be drawn between pole tip and pole yoke regions. The values of P, $H_k$, and $H_c$ may differ from pole tip to pole yoke, and optimization of these variables for a given device must be considered in the light of such differences.

Other embodiments are within the following claims.

We claim:

1. A process for forming at least one pole of a magnetic device, comprising the steps of:
   (a) determining a maximum permeance for a chosen pole width,
   (b) determining an anisotropy field for a pole having the chosen pole width based on the maximum permeance,
   (c) determining a desired cobalt concentration for a deposition bath based on the anisotropy field, and
   (d) forming the at least one pole from the deposition bath, the pole having approximately the desired cobalt concentration.

2. The process of claim 1 wherein step (d) is followed by annealing the formed pole.

3. The process of claim 1 wherein the coercivity of the formed pole is at or below 1 Oersted.

4. The process of claim 1 wherein the formed pole, at the pole tip, is 3 microns wide, greater than one micron thick and has a permeability of less than 1500.

5. The process of claim 2 wherein the anisotropy field is in the range of 3 to 14 Oersteds.

6. The process of claim 2 wherein the pole anisotropy is 9 Oersteds before annealing and 12 Oersteds after annealing.

7. The process of claim 1 wherein the deposition bath is a nickel-iron plating bath and cobalt content is in the range of about 20–25% by weight in the bath.

8. The process of claim 1 wherein the formed pole is about 61.5–66% nickel by weight, 13–14.5% iron by weight, and 21–24% cobalt by weight.

9. The process of claim 1 or 2 wherein step (d) includes forming the pole having near zero magnetostriction.

10. The process of claim 9 wherein the near zero magnetostriction is in the range of about $-5.3 \times 10^{-7}$ to zero.

11. The process of claim 1 wherein step (d) includes the substep of forming the pole in a bath concentration having cobalt chloride hexahydrate at about 3.65 grams per liter.

12. The process of claim 2 wherein the composition of the annealed pole product is about 64.5% nickel, 13.5% iron, and 22% cobalt by weight.

13. The process of claim 1 wherein step (d) includes obtaining a ratio of $W_c/W_t$ in the range of about 0.5 to 0.7, with coercivity at or about below 1 Oersted.

14. The process of claim 1 wherein the bath is a modified Watt's bath including
   nickelous chloride,
   sodium saccharin,
   ferrous chloride, and
   cobaltous chloride.

15. The process of claim 1 wherein the product of step (d) has a saturation flux density of about 13,000 Gauss.

16. The process of claim 2 wherein the pole has a transverse easy axis and the annealing is performed by baking the pole in a vacuum at about 240 degree centigrade for about 8 hours in an orienting magnetic field parallel to the easy axis of the pole.

17. The process of claim 16 wherein the orienting field is about 1,100 Oersteds or more.

18. A process for producing a thin film head including the steps of:
   (a) defining a pole pattern on a metallized surface of a wafer,
   (b) mounting the wafer on a cathode fixture and immersing it in a plating bath,
   (c) forming a cobalt alloy pole according to the pole pattern while maintaining magnetostriction near zero and controlling cobalt content to achieve a maximum pole permeance in accordance with the defined pole pattern, and
   (d) annealing the product of step (c).

19. The process of claim 1 wherein the pole is formed by sputter deposition, vacuum evaporation, ion plating, splat cooling, electro-deposition or electroless deposition.

20. The process of claim 18 wherein the bath is a modified Watt's bath including nickelous chloride, sodium saccharin, ferrous chloride, and cobaltous chloride.

21. A magnetic transducer having at least one pole with about 61.5–66% nickel by weight, 13–14.5% iron by weight, and 21–24% cobalt by weight, and also having near zero magnetostriction.

22. The transducer of claim 21 wherein at least one pole is annealed.

23. The transducer of claim 22 wherein the ratio of $W_c/W_t$ of at least one pole is in the range of 0.5 to 0.7.

24. The transducer of claim 23 wherein the pole has a coercivity of about at or below 1 Oersted and effective pole width is about 3 microns, with an anisotropy field of about 12 Oersteds.

* * * * *